US008024861B2

(12) United States Patent
Perry

(10) Patent No.: US 8,024,861 B2
(45) Date of Patent: Sep. 27, 2011

(54) EXTERNAL STROKE/FLOW SETTING METHOD FOR FUEL INJECTORS

(75) Inventor: Robert B. Perry, Leicester, NY (US)

(73) Assignee: Delphi Technologies, Inc., Troy, MI (US)

( * ) Notice: Subject to any disclaimer, the term of this patent is extended or adjusted under 35 U.S.C. 154(b) by 699 days.

(21) Appl. No.: 12/152,794

(22) Filed: May 16, 2008

(65) Prior Publication Data

US 2009/0282682 A1 Nov. 19, 2009

(51) Int. Cl.
*B05B 1/30* (2006.01)
*B23P 17/00* (2006.01)

(52) U.S. Cl. ................................ 29/890.128; 29/890.13

(58) Field of Classification Search ............. 29/890.129, 29/890.13, 890.132, 407; 83/860–889; 239/533.2, 239/533.3

See application file for complete search history.

(56) References Cited

U.S. PATENT DOCUMENTS

| | | | |
|---|---|---|---|
| 3,608,171 | A | 9/1971 | Stradtmann |
| 5,158,236 | A | 10/1992 | Sugiyama |
| 6,056,263 | A | 5/2000 | Stier |
| 6,385,848 | B1 | 5/2002 | D'Arrigo |
| 6,687,965 | B2 | 2/2004 | D'Arrigo |
| 6,786,432 | B1 | 9/2004 | Reiter |
| 2003/0084571 | A1 | 5/2003 | D'Arrigo |
| 2003/0122001 | A1 | 7/2003 | Kobayashi et al. |

FOREIGN PATENT DOCUMENTS

| | | |
|---|---|---|
| DE | 10044212 | 4/2002 |
| WO | 9814701 | 4/1998 |
| WO | 0104487 | 1/2001 |

OTHER PUBLICATIONS

EP Search Report dated Oct. 14, 2009.

*Primary Examiner* — David Bryant
*Assistant Examiner* — Moshe Wilensky
(74) *Attorney, Agent, or Firm* — Thomas N. Twomey

(57) ABSTRACT

A method for externally adjusting the axial length of a solenoid actuated fuel injector includes the step of externally forming a helical scribe mark in a housing component, thereby changing the axial length of the injector. By adjusting the length of the helical scribe mark and the depth of the scribe mark, and by measuring the stroke or the flow rate of the injector, the stroke or the flow rate of injector may be set precisely. The external adjustment of the length of the housing component may be made in cartridge form as well as in final assembly form of the fuel injector complementing the manufacturing process versatility.

23 Claims, 2 Drawing Sheets

EXTERNAL STROKE/FLOW SETTING METHOD FOR FUEL INJECTORS

TECHNICAL FIELD

The present invention relates to fuel injection systems of internal combustion engines; more particularly, to solenoid actuated fuel injectors; and most particularly, to a method for externally setting the injector valve stroke and static flow.

BACKGROUND OF THE INVENTION

Fuel injected internal combustion engines are well known. Fuel injection arrangements may be divided generally into multi-port fuel injection (MPFI), wherein fuel is injected into a runner of an air intake manifold ahead of a cylinder intake valve, and gasoline direct injection (GDI), wherein fuel is injected directly into the combustion chamber of an engine cylinder, typically during or at the end of the compression stroke of the piston. GDI is designed to allow greater control and precision of the fuel charge to the combustion chamber, resulting in better fuel economy and lower emissions. This is accomplished by the combustion of a precisely controlled mixture under various operating conditions. GDI is also designed to allow higher cylinder compression ratios, delivering higher performance with lower fuel consumption compared to other fuel injection systems.

Generally, an electromagnetic fuel injector incorporates a solenoid armature, located between the pole piece of the solenoid and a fixed valve seat. Electromagnetic fuel injectors are linear devices that meter fuel per electric pulse at a rate proportional to the width of the electric pulse. The armature typically operates as a movable valve assembly. In a normally-closed injector, when the injector is de-energized, its movable valve assembly is released from one stop position and accelerated by a spring towards the opposite stop position, located at the valve seat. The distance between the stop positions constitutes the stroke.

A solenoid actuated fuel injector for automotive engines is required to operate with a small and precise stroke of its core or valve in order to provide a fuel flow rate within an established tolerance. The stroke of the moving mass of the fuel injector is critical to function, performance, and durability of the injector. Moreover, since GDI Injectors require a relatively high fuel pressure to operate that may be, for example, as high as 1700 psi compared to about 60 psi required to operate a typical MPFI injector, the fuel flow of GDI injectors is more sensitive to variations in stroke than MPFI injectors. Thus, a tighter control of the stroke set, such as about ±5 microns, is needed in GDI injectors.

In some current injectors, the stroke is adjusted at assembly by moving an adjustable valve seat a predetermined dimension from a seated valve position after related components are first crimped or welded in place. This allows the stroke setting operation to compensate for assembly tolerances which result from the crimping or welding operations. However, the requirement for an adjustable valve seat adds cost and complexity to the assembly process.

Other prior art stroke adjusting methods for solenoid operated injectors include, for example, pre-measurement of stroke followed by shimming to obtain a desired target stroke, movement of a component followed by welding or staking of that component to set the stroke, or application of multiple axial laser weld stitches to set the stroke. Setting the stroke in some of these ways typically leads to a change in the setting caused by the welding or staking, thereby increasing the tolerance capability of the process. Moreover, these stroke setting methods described do not readily allow for a static flow setting process.

What is needed in the art is a stroke setting method for a solenoid actuated fuel injector that permits an accurate adjustment of the static flow and that does not require welding or mechanical deformation processes to be performed after the stroke adjustment is made.

It is a principal object of the present invention to provide a method for externally setting the stroke and the static flow of the injector while in cartridge form as well as in final assembly form.

SUMMARY OF THE INVENTION

Briefly described, a method for externally setting the stroke of a solenoid actuated injector in accordance with the invention involves a step of forming a helical scribe mark externally to a thin walled injector component housing a valve assembly, such as the lower housing of a fuel injector, in an area where the material to be scribed has a relatively high residual stress level. The method in accordance with the invention enables precise external adjustment of the stroke of the moving mass of the injector and is therefore suitable, for example, to adjust the stroke of a GDI injector where a tighter control of the stroke set is needed. The method in accordance with the invention further enables external adjustment of the static flow of the completely assembled injector.

Scribing of the helical mark on the surface of the housing releases some of the residual stress of the housing and causes the length of the housing to increase and the position of the valve seat to move proportionally to the amount of released stress. The increase in length of the housing is proportional to the length of the helical scribe mark as well as the depth of the scribe mark.

The external stroke adjustment may be made to the injector in cartridge form (i.e., to a valve/seat subassembly) as well as in final assembly form. This complements the manufacturing process versatility. The external adjustment may be made while the stroke is being measured. The external adjustment may further be made while fluid is flowing through the injector in order to set static flow.

Contrary to the known prior art, the method in accordance with the present invention does not create heat of a magnitude to cause a stroke shift, due to thermal expansion and contraction, while the setting is being made or after the setting has been made. Moreover, the method in accordance with the invention does not require welding or other mechanical deformation methods to be performed after the stroke adjustment is made that could change the setting. Furthermore, the method in accordance with the invention eliminates the potential of contaminating the injector due to skiving of internal parts while the setting is being made as found in the prior art. Varying the length and depth of the helical scribe mark in accordance with the present invention provides for an infinite number of set points within a limited range, and provides for a reduced stroke tolerance and for setting a desired static flow.

BRIEF DESCRIPTION OF THE DRAWINGS

The present invention will now be described, by way of example, with reference to the accompanying drawings, in which.

Corresponding reference characters indicate corresponding parts throughout the several views. The exemplification set out herein illustrates a preferred embodiment of the invention, in one form, and such exemplification is not to be construed as limiting the scope of the invention in any manner.

DESCRIPTION OF THE PREFERRED EMBODIMENTS

Figure 1:
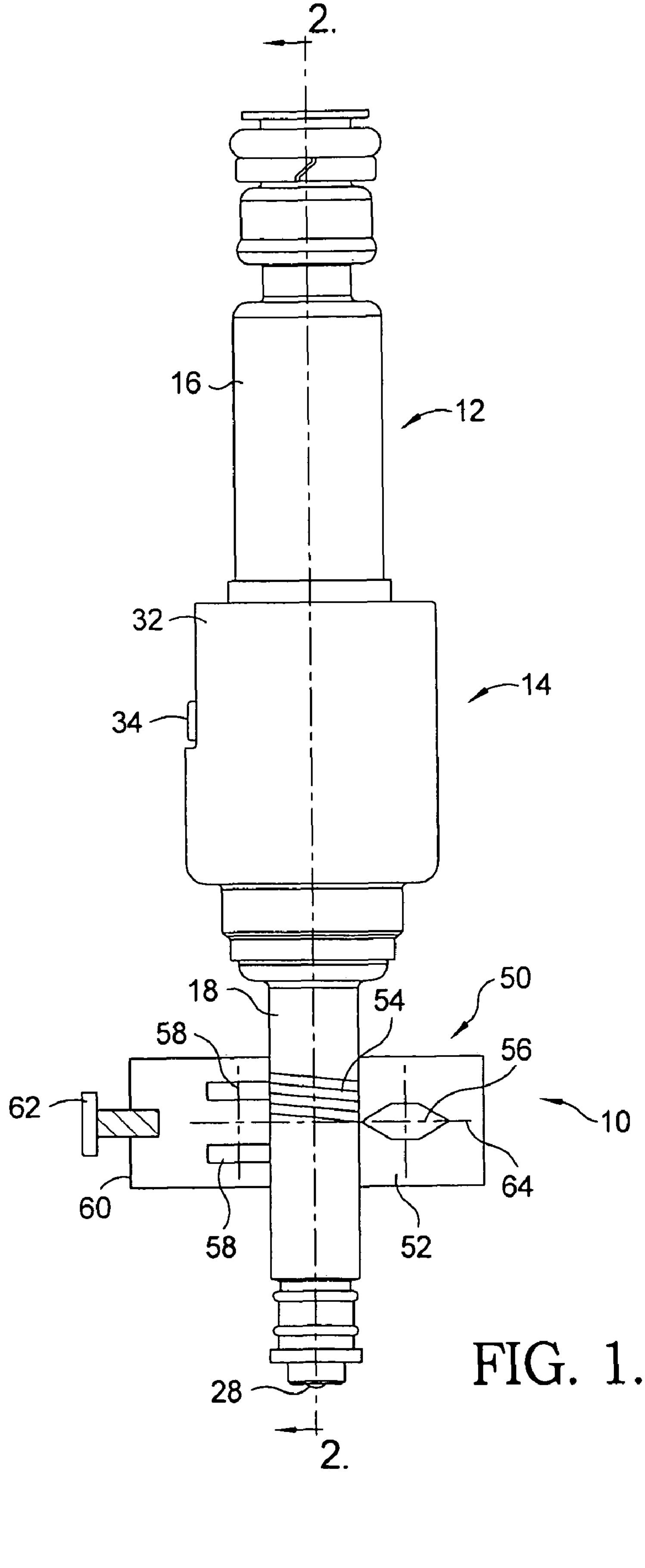
FIG. 1 is a front elevational view of a solenoid actuated fuel injector, in accordance with the invention.
Figure 2:
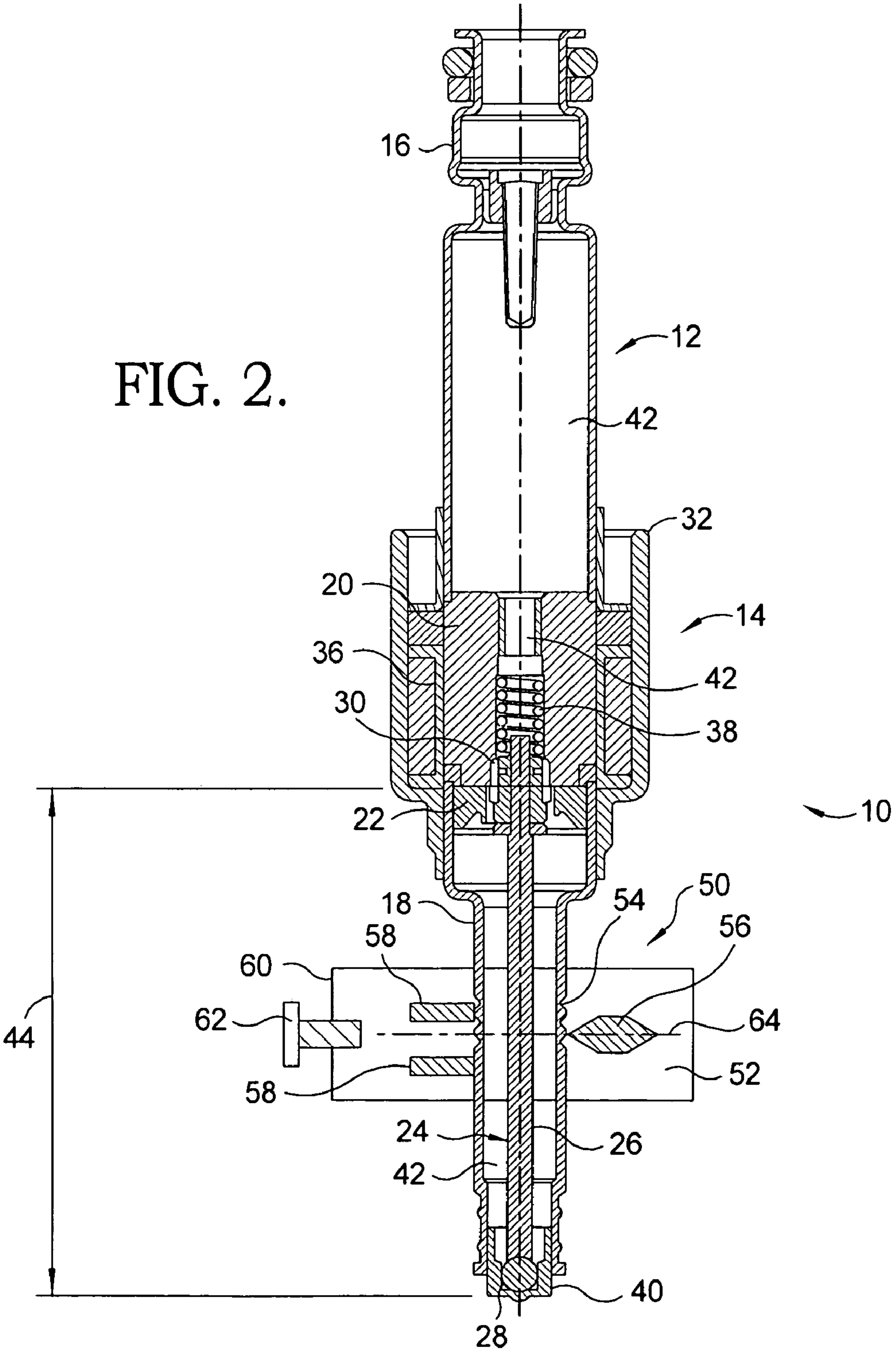
FIG. 2 is a cross-sectional view along line 2-2 of the solenoid actuated fuel injector, in accordance with the invention.

Referring to FIGS. 1 and 2, a solenoid actuated fuel injector 10 includes a cartridge assembly 12 and a solenoid assembly 14. Fuel injector 10 may be, for example, an injector for direct injection.

Cartridge assembly 12 includes all moving parts and fuel containing components of injector 10, such as an upper housing 16, a lower housing 18, a pole piece 20 positioned between upper housing 16 and lower housing 18, and an armature 22 having a pintle assembly 24 attached thereto. Upper housing 16, lower housing 18, and pole piece 20 enclose a fuel passage 42. Pintle assembly 24 includes a pintle 26 and a ball 28. A first end of pintle 26 is attached to armature 22, for example, by using a weld block 30. Ball 28 is attached at an opposite end of pintle 26. Armature 22 and pintle assembly 24 form a valve assembly and constitute the moving mass of fuel injector 10. Armature 22 and pintle assembly 24 are positioned within lower housing 18 such that armature 22 and pintle assembly 24 are able to move up and down in an axial direction. A spring 38 may be positioned in a center bore formed in pole piece 20 above and in contact with pintle assembly 24, to bias the pintle and ball toward valve seat 40.

Solenoid assembly 14 includes all external components of injector 10, such as an actuator housing 32, an electrical connector 34, and a coil assembly 36. Solenoid assembly 14 surrounds pole piece 20.

Solenoid actuated fuel injector 10 is a linear device that meters fuel per electric pulse at a rate proportional to the width of the electric pulse. In the example shown of a normally closed injector, when injector 10 is de-energized, movable armature 22 and pintle assembly 24 are released from a first stop position where armature 22 contacts pole piece 20 and accelerated by spring 38 towards the opposite second stop position, located at valve seat 40 integrated into lower housing 18. The distance in which the pintle assembly travels between the first and the second stop position constitutes the stroke.

In accordance with one aspect of the invention, lower housing 18 is a relatively thin walled tube having relatively high residual stresses. Residual stress is produced by heterogeneous plastic deformations, thermal contractions, and phase transformations induced by the manufacturing process. For example, lower housing 18 may be a deep drawn component where the residual stress is induced during the deep drawing process. During the forming process, the material experiences a radial drawing stress and a tangential compressive stress due to material retention properties. Other manufacturing processes that induce residual stress include, for example, casting, forming, and extruding. Residual stress may further be induced by removal of material from a surface, mechanical surface treatments, heat treatments, chemical treatments, or thermochemical treatments.

Using a cutting or marking tool 50, for example, a cutter 52 as shown in FIG. 1, a helical scribe mark 54 is formed externally in the surface of lower housing 18. A preferred position of the helical scribe mark 54 is in a center region of lower housing 18, as shown. Note that scribe axis 64 is tipped relative to longitudinal axis 65 of lower housing 18 so that a helical path of scribe mark 54 is followed. By forming helical scribe mark 54 in the thin wall lower housing 18, a portion of the residual stress is relieved, which results in an increase in the axial length 44 of lower housing 18.

Cutter 52 may include a rolling wheel 56 and two supporting rollers 58 arranged opposite from wheel 56. Supporting rollers 58 may be positioned on either side of axis 64 of wheel 56. A housing 60 may structurally support wheel 56 and supporting rollers 58. Housing 60 may have a "C"-shape or a "U"-shape. Scribing wheel 56 and rollers 58 are rotatably mounted within housing 60 to facilitate its positioning around housing 18.

Cutter 52 further includes an adjusting member 62 that can be used to increase or decrease the pressure applied to lower housing 18 by rollers 58 and wheel 56. Adjusting member 62 may be, for example, threadable, such as a screw, or may be advanced in any other way. In one direction, adjusting member 62 moves wheel 56 and rollers 58 towards each other to enable engagement of cutter 52 with lower housing 18 as shown in FIG. 1, and to increase the force of scribing wheel 56 acting on lower housing 18, thereby proportionally increasing the depth of scribe mark 54. In the other direction, adjusting member 62 may be used to move wheel 56 and rollers 58 away from each other to decrease the force acting on lower housing 18, thereby proportionally decreasing the depth of scribe mark 54. To form helical scribe mark 54 into lower housing 18, tool 50 is turned circumferentially around lower housing 18 so that the resulting scribe mark 54 follows a spiral path around housing 18. The pitch of helical scribe mark 54 may be controlled by changing the angle of axis 64 relative to longitudinal axis 65.

While cutter 52 is shown in FIG. 1 and described above, other metal cutting or marking tools may be used to form helical scribe mark 54 in lower housing 18.

The force of wheel 56 acting on lower housing 18 and, therefore, the depth of the scribe mark, are proportional to the amount of residual stress relieved within the material of the lower housing 18. Therefore, the length 44 changes proportionally with the depth of mark 54 formed in the housing. Accordingly, the higher the force, the deeper the helical scribe mark 54, the larger the amount of residual stress relieved, and the larger the increase in length 44 of lower housing 18. Also, the number of turns or the length of helical scribe mark 54 also affects the amount of increase in length 44 of lower housing 18. The longer the scribe mark 54 or the higher the number of turns, the larger is the increase in length 44 of lower housing 18.

By adjusting the cutting force of cutting wheel during the process of forming helical scribe mark 54, either continuously or intermittently, and by adjusting the number of turns of helical scribe mark 54, length 44 of lower housing 18 and, therefore, the stroke of armature 22 and pintle assembly 24 of fuel injector 10, may be accurately adjusted. Therefore, it is desirable to assemble the injector having a stroke smaller than the desired stroke prior to forming helical scribe mark 54. It may further be possible to initially assemble the injector with zero pintle stroke, prior to externally setting the stroke or the static flow.

By first starting to form helical scribe 54 in lower housing 18 at a higher force, then lowering the force in a following step, the growth of axial length 44 may be may be gradually increased, then stopped at precisely the desired length. Similarly, the pitch of helical scribe mark 54 may be started at a lower pitch, then changed gradually to a higher pitch to a point where the desired length may be precisely set.

It may further be possible to determine how many turns at a certain wheel force are needed to achieve a certain increase in length 44, and therefore a certain stroke, thereby eliminating the need to measure length 44 during the process of forming helical scribe mark 54. In addition to setting the stroke of injector 10 externally, the process as described may be used to precisely set the static flow of injector 10 as desired. The flow adjustment would be made by choosing the desired wheel force and wheel pitch as static flow across the seat is being measured.

This described process of adjusting the axial length of lower housing 18 to set stroke or static flow may be applied to injector 10 in cartridge form or in final assembly form.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A method for externally adjusting an axial length of a tubular housing of a solenoid actuated fuel injector, comprising the step of:

forming a helical scribe mark on an external surface of said housing thereby increasing the axial length of said housing component proportional to a portion of a residual stress contained within said housing.

2. The method in accordance with claim 1, further including the step of:

assembling a valve and a seat in said housing prior to forming said helical scribe mark.

3. The method in accordance with claim 1, further including the step of:

completely assembling said fuel injector prior to forming said helical scribe mark.

4. The method in accordance with claim 1, further including the step of:

assembling said fuel injector at a zero stroke condition prior to forming said helical scribe mark.

5. The method in accordance with claim 1, further including the step of:

forming said housing by a deep drawing process.

6. The method in accordance with claim 1, further including the step of:

using a tool to form said helical scribe mark.

7. The method in accordance with claim 1, further including the step of:

forming said helical scribe mark while measuring a valve stroke of said fuel injector.

8. The method in accordance with claim 1, further including the step of:

forming said helical scribe mark while measuring a flow rate of fuel flowing through said fuel injector.

9. The method in accordance with claim 1 further including the step of:

varying a depth of said helical scribe mark.

10. The method in accordance with claim 1 further including the step of:

varying a pitch of said helical scribe mark.

11. The method in accordance with claim 1 further including the step of:

varying a depth of said helical scribe mark and varying a pitch of said helical step.

12. A method for externally setting a valve stroke of a solenoid actuated fuel injector, comprising the steps of:

forming a tubular lower housing enclosing a valve assembly of said fuel injector;

scoring a helical scribe mark in an external surface of said lower housing with a tool, thereby increasing an axial length of said lower housing;

measuring said valve stroke of said fuel injector; and stopping formation of said helical scribe mark when a desired valve stroke is reached.

13. The method in accordance with claim 12 further including the step of:

varying a depth of said helical scribe mark before said stopping step.

14. The method in accordance with claim 12 further including the step of:

varying a pitch of said helical scribe mark before said stopping step.

15. The method in accordance with claim 12 further including the step of:

varying a depth of said helical scribe mark and varying a pitch of said helical step before said stopping step.

16. The method in accordance with claim 12, further including the step of:

using a cutter to form said helical scribe mark including a wheel and at least one roller.

17. The method in accordance with claim 12, further including the step of:

forming said helical scribe mark in a center region of said lower housing.

18. The method in accordance with claim 12, further including the step of:

forming said lower housing by a deep drawing process.

19. The method in accordance with claim 12, further including the step of:

using said fuel injector for direct injection of liquid fuel.

20. A method for externally setting a static flow of a solenoid actuated fuel injector, comprising the steps of:

forming a tubular lower housing enclosing a valve assembly of said fuel injector;

assembling said fuel injector including said lower housing enclosing said valve assembly;

flowing fuel through said assembled fuel injector;

forming a helical scribe mark in an external surface of said lower housing with a tool;

measuring a flow rate of said fuel flowing through the fuel injector; and stopping formation of said helical scribe mark when a desired flow rate is reached.

21. The method in accordance with claim 20 further including the step of:

varying a depth of said helical scribe mark before said stopping step.

22. The method in accordance with claim 20 further including the step of:

varying a pitch of said helical scribe mark before said stopping step.

23. The method in accordance with claim 20 further including the step of:

varying a depth of said helical scribe mark and varying a pitch of said helical step before said stopping step.

* * * * *